Patented Mar. 12, 1929.

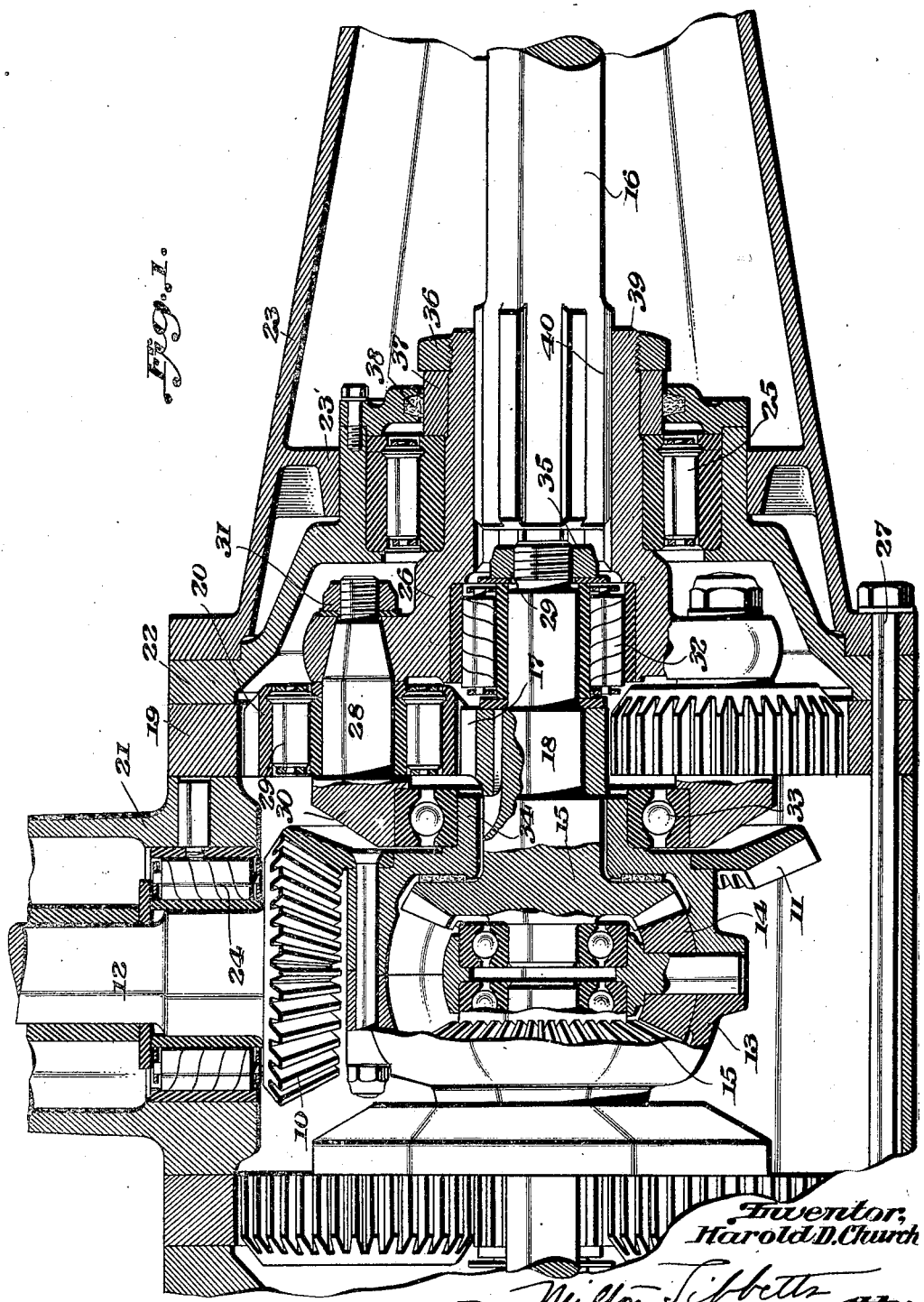

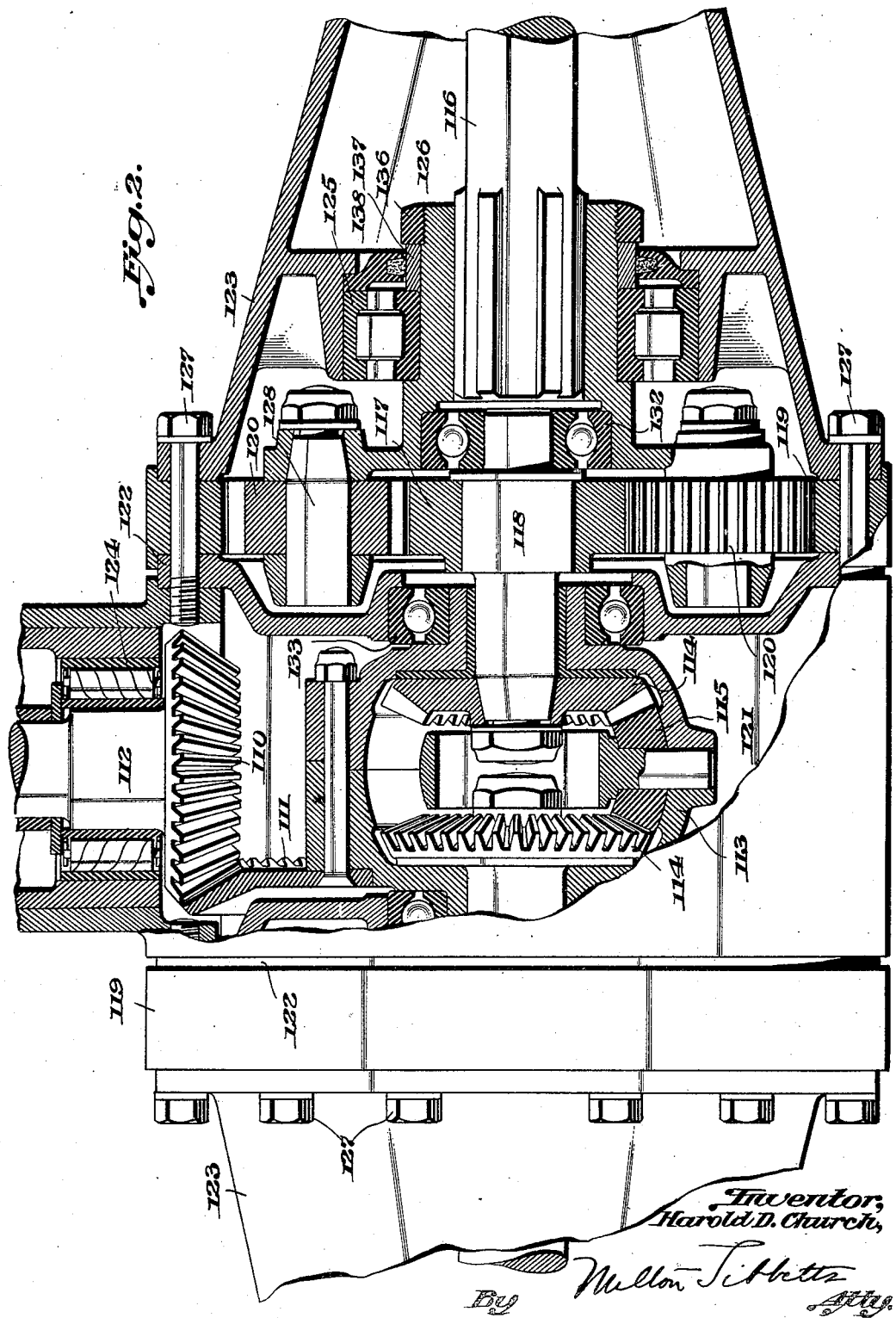

1,704,725

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed September 25, 1919. Serial No. 326,329.

This invention relates to motor vehicles and particularly to the driving axle construction.

One of the objects of the invention is to provide a driving axle of light weight for given load and torque capacity.

Another object is to provide maximum road clearance in an axle having reduction gearing at the middle part of the axle.

Other objects will appear from the following description taken in connection with the drawings, which form a part of this specification, and in which:

Figure 1 is a horizontal section through a driving axle embodying the invention; and Figure 2 is a similar view showing another form of the invention.

Referring to the drawings, Figure 1, 10 represents the driving and 11 the driven gear forming a pair of driving gears of a driving axle. The gear 10 is driven from the vehicle engine (not shown) through the shaft 12, and the gear 11 is shown as mounted on a differential housing 13. In the housing are differential pinions 14 (one only being shown) and differential gears 15, of the bevel or other usual type.

As the axle is the same on both sides of the differential, only one side will be described in detail. An axle shaft or section 16 is arranged for connection with the vehicle wheel (not shown) at the outer end of the axle, and between the gears 10, 11, and this shaft 16 is arranged a reduction gearing of the planetary type. A pinion 17 is keyed or otherwise secured to the spindle 18 of one of the differential gears 15 and a ring gear 19 is stationarily mounted in the same plane. One or more (three would be used in the construction shown) planet gears 20 are arranged to mesh with both the pinion 17 and the ring gear 19 so that the rotary movement of the pinion 17 may be transmitted to the axes of the planet gears, but at a considerable reduction due to the different number of teeth between the pinion and the ring gear 19.

Surrounding all of the above mechanism, except the ring gear 19, is an axle casing shown as formed of several sections of which said ring gear 19 is one. Thus there is a middle section 21, a section formed by the ring gear 19, a bearing section 22, and a tubular section 23 which extends outwardly over the shaft 16. The middle section 21 has a bearing 24 for the shaft 12; the section 19 has the internal teeth forming the stationary gear for the planetary gearing as above described; the section 22 telescopes somewhat into the section 23 and has a bearing 25 for a spider 26, hereinafter more fully described; and the section 23 forms the principal supporting part of the structure, the wheels being supported upon its outer end. An inner flange 23' braces the outer end of the bearing section 22 as shown. All of these sections, including those on both sides of the middle section 21, are secured together by a series of bolts 27, thus making a rigid construction.

The spider 26 above described includes spindles 28, for bearings 29 upon which the gears 20 rotate, and a ring 30 integral with these spindles. The two parts of the spider are secured together by nuts 31. The main part of the spider has a bearing 32 for the end of the spindle 18 on the gear 15, and the ring 30 has a bearing 33 for the hub 34 of the differential housing 13 upon which the gear 11 is mounted. A nut 35 retains the inner race of the bearing 32 on the spindle 18.

The bearing 25 for the spider 26 is retained in place by a nut 36 and ring 37 at the outer end of the spider. A packing ring 38 is secured to the outer end of the bearing section 22 and makes a running joint with the circumference of the ring 37 to retain the lubricant.

The spider 26 is formed with a hollow hub 39 into which the inner end of the shaft 16 projects, keys and keyways 40 being provided to cause the parts to rotate together while permitting the shaft 16 to be readily withdrawn.

From the above it will be seen that the maximum amount of road clearance is provided due to the fact that part of the casing is formed by the ring gear 19, and the construction as a whole is light and strong.

Referring to Figure 2, 110 and 111 are driving and driven gears respectively, the gear 110 being driven from the engine through shaft 112, and the gear 111 being mounted on the differential housing 113. The differential comprises pinions 114 and gears 115. 116 is the axle shaft or section, 117 is the pinion on the spindle 118, 119 is the ring gear, and 120 represents the planet gears.

The axle casing is formed by a middle section 121, the ring gear section 119, a bearing section 122, and a tubular section 123, all connected by bolts 127. The middle section 121 holds a bearing 124 for the shaft 112; the gear section 119 forms the ring gear as in the other construction; but the bearing section 122 is arranged inwardly of the ring gear 119 and has a bearing 133 for the differential housing 113 on which is the gear 111. Thus there is an independent support for the differential housing, having no connection with the spider 126 of the planetary gearing. Also the section 123 directly supports a bearing 125 for the spider 126 above referred to. A nut 136, ring 137, and packing 138 are provided as in the other construction.

Gears 120 are mounted directly on spindles 128 on spider 126 and a bearing 132 is provided in the spider for the end of the spindle 118.

The maximum road clearance is also found in this construction and some advantage accrues to having the independent mounting for the differential housing bearing.

I claim:

1. In a vehicle axle, the combination with an axle casing, a differential housing, differential gearing mounted in said housing, driven axle sections, and planetary gearing means between said differential gearing and said axle sections and including a spider, a bearing between one of said differential gears and said spider and a bearing between said differential housing and said spider.

2. In a driving axle, in combination, driving and driven gears, axle sections, a casing made up of sections including a middle section, gear sections, bearing sections, and tubular sections, said sections being bolted together, and planetary gearing between said gears and axle sections and including as a part thereof the gear sections of the casing.

3. In a driving axle for motor vehicles, a drive shaft, driven shaft sections, and operative driving connections between the shaft and the shaft sections, including differential and planetary gearing, a spider for said planetary gearing, and bearings for the differential housing carried by said spider.

4. In a driving axle for motor vehicles, a drive shaft, shaft sections, a casing comprising a middle section, tubular axle sections, and a member positioned between said sections of the casing and having a bearing, a spider mounted in said bearing and connected to a shaft section, planet gears carried by said spider and gearing connections between said planet gears and said drive shaft.

5. In a vehicle axle, the combination with the differential gearing including a driving bevel gear having an extension, of an axle section in line with said gear, a pinion on said extension, a ring gear in the plane of said pinion, a cage connected to said axle section, and gears mounted in said cage and adapted to mesh with the gear on said extension and said ring gear.

6. In a motor vehicle, in combination, a planetary gearing comprising a ring gear and a plurality of planet gears, a spider adapted to support said planet gears, a plurality of bevel gears, means connecting said bevel gears together, one of said bevel gears being connected to said planet gears, and bearings in said spider, for said bevel gears.

7. In a driving axle, in combination, a driving gear, a driving shaft connected thereto, a driven gear, a driven shaft, a connection between said driven gear and said driving gear, and another connection between said driven gear and said driven shaft, said last mentioned connection including a planetary gearing comprising a ring gear and planet gears, and a spider associated with said planet gears, said spider including bearings for said driving and driven gears.

8. In a driving axle mechanism, a driving gear and driven gears interconnected therewith, axle sections connected respectively to said driven gears, said axle connections each including a planetary gearing including a ring gear and planet gears, and a spider associated with each planetary gearing, said spiders each including a plurality of bearings for said driving and driven gears.

9. In combination, a driving gear, a driven gear, means interconnecting said gears, planetary gears connected to one of said first mentioned gears, a two part spider for said planetary gears, and a separate bearing in each part of said spider for said driving and driven gears.

10. In combination, a differential housing, differential gearing mounted in the housing, a planetary gearing comprising a ring gear and planet gears, said planet gears being connected to one of said differential gears, a spider for said planetary gearing having a plurality of sections, and a bearing in each section supporting one of the differential gears in one section and the differential housing in another section.

11. In combination with a differential housing, differential gearing mounted in the housing, a planetary gearing connected to one of the differential gears, a spider supporting said planetary gearing and having sections on opposite sides thereof and a bearing member in each of said sections supporting one of the differential gears in one section and the differential housing in another section.

In testimony whereof I affix my signature.

HAROLD D. CHURCH.